Nov. 8, 1960
L. E. HOYER
2,959,432
DUST GUARDS
Filed Jan. 23, 1957
2 Sheets-Sheet 1
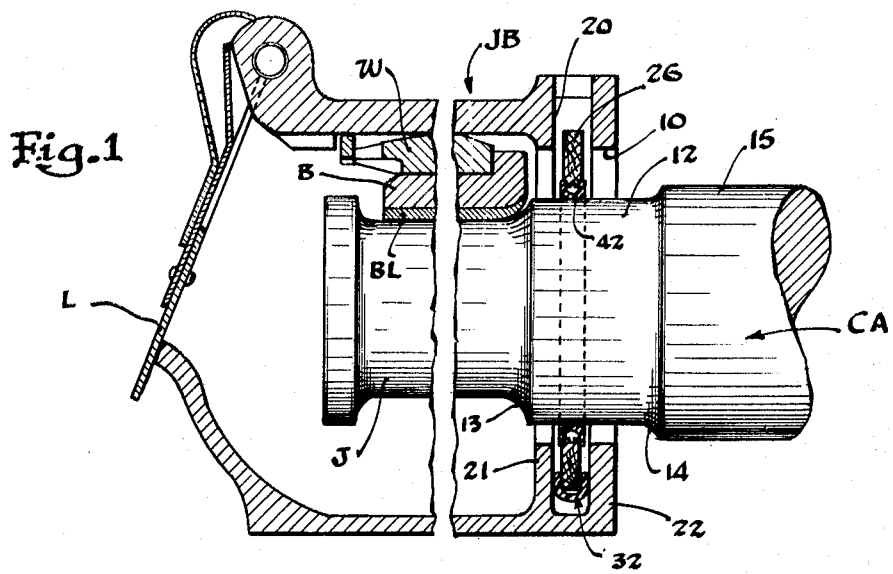
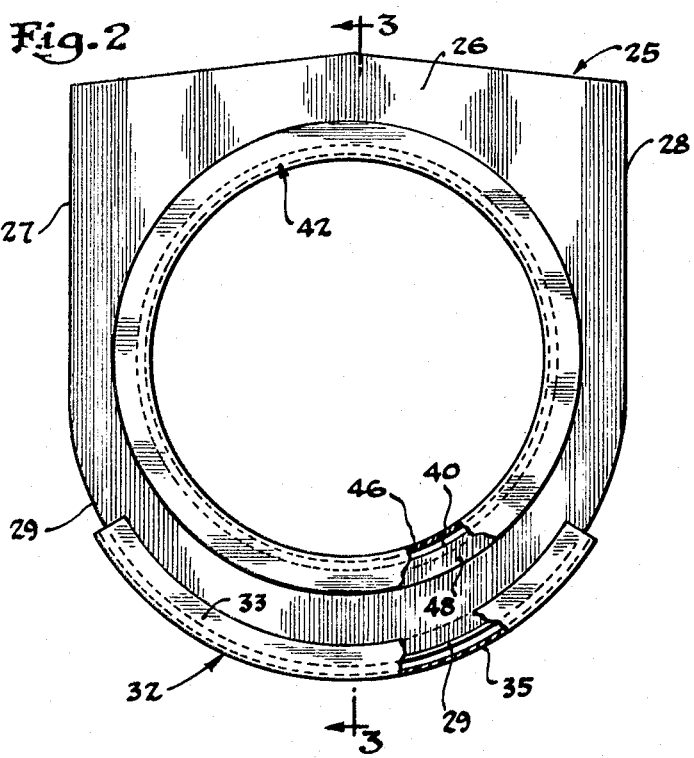
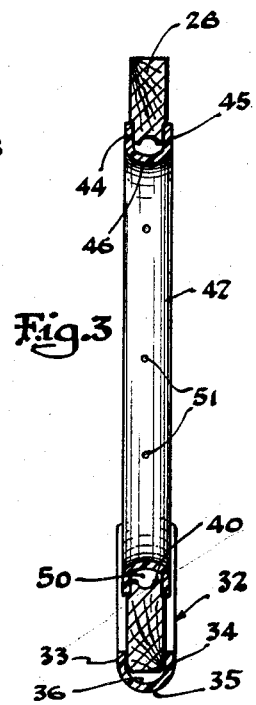
Inventor
Llewellyn E. Hoyer
By Wallace and Cannon
Attorneys Nov. 8, 1960 L. E. HOYER 2,959,432
DUST GUARDS
Filed Jan. 23, 1957 2 Sheets-Sheet 2
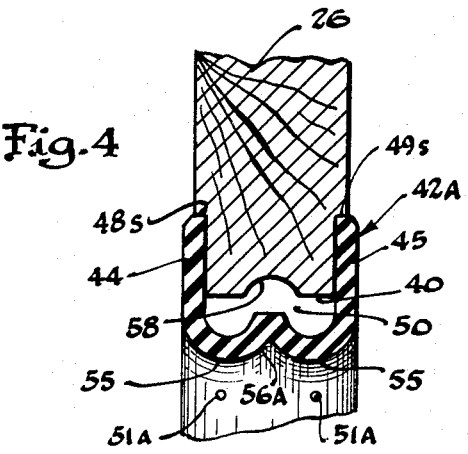
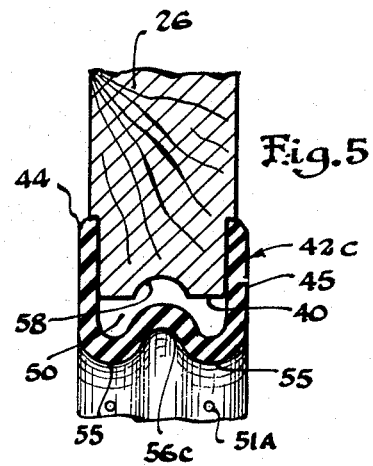
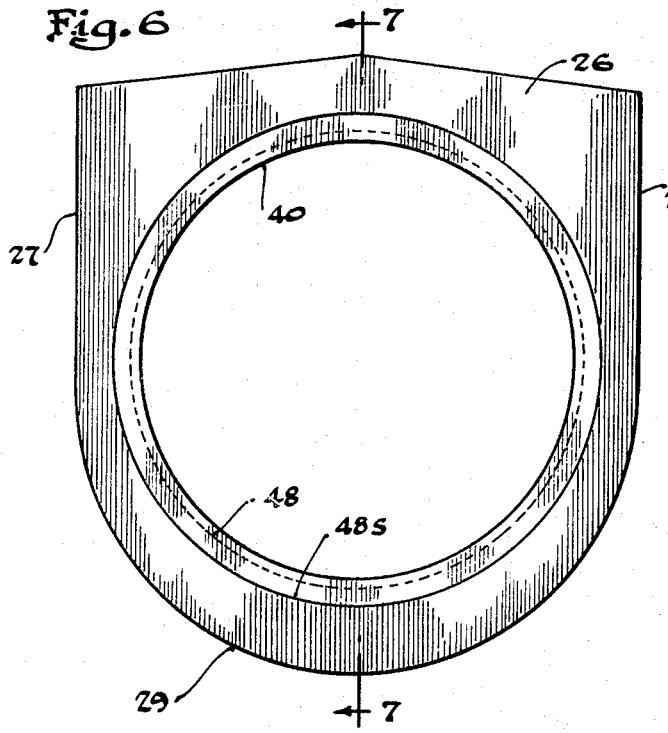
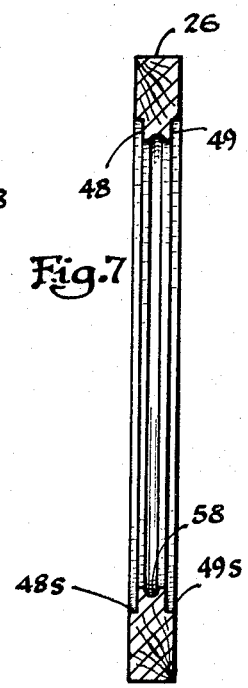
Inventor
Llewellyn E. Hoyer
By Wallace and Cannon
Attorneys

United States Patent Office 2,959,432
Patented Nov. 8, 1960

2,959,432
DUST GUARDS

Llewellyn E. Hoyer, Wyckoff, N.J., assignor to American Brake Shoe Company, New York, N.Y., a corporation of Delaware Filed Jan. 23, 1957, Ser. No. 635,667

3 Claims. (Cl. 286—6)

This invention relates to a dust guard and more particularly to a dust guard for the journal box of a railway car.

The proper lubrication of a journal or the kind that is extended into a journal box is in many instances related to the dust guard. One particularly troublesome problem is proper retention of the dust guard in the journal box, and another problem has been the achievement of a good seal fit between the dust guard and the journal. There are numerous proposals in the prior art directed to these problems, but the chief objection in most instances is the relatively high cost of the structure entailed. On the other hand, while it is apparent that a plain wooden dust guard per se is probably the cheapest form of dust guard, such has never produced an entirely satisfactory seal of the journal box. In view of the foregoing, the primary object of the present invention is to enable both the journal and the journal box of a railway car or the like to be effectively sealed by a dust guard of such construction as to be relatively inexpensive to manufacture and to maintain during subsequent use, and an object related to this is to enable a relatively inexpensive dust guard embody a seal plate of plywood or the like to be effectively retained in position in a journal box in surrounding seal fit relation about a journal.

The primary function of a dust guard is of course to prevent loss of lubricant from within the journal box and to prevent the passage of dust or like foreign matter thereto from the outside of the journal box. This entails first of all a proper sealing relation between the dust guard and the journal box, and it is also desirable under many circumstances that there be an effective seal between the journal and the dust guard. Another object of the present invention is to effectively seal the journal and the journal box with a dust guard which nevertheless embodies relatively inexpensive structure, and an object related to this is to associate with the dust guard a retainer which can be replaced if worn or damaged.

Sometimes a plywood dust guard seal for a journal box is of less width than the slot in the journal box in which it is mounted, and this is so in order to reduce the likelihood of breakage of the dust guard due to movement of the journal. In other words, if the dust guard were as wide as the dust guard slot and composed of relatively rigid material such as plywood or the like, it is possible for the guard to be ruptured or broken in those instances where one of the fillet surfaces on the journal shifts suddenly with great force against the dust guard. However, a full width dust guard does have the advantage of being capable of effectively sealing the complete width of the dust guard slot particularly at the bottom thereof, but on the other hand a dust guard of less narrow width than the width of the dust guard slot has the advantage of venting the interior of the journal box which prevents build-up of pressure within due to what in effect represents a pumping action by the journal during axial thrust of the car axle. Another object of the present invention is to effectively close off the lower portion of the dust guard slot of a journal box while assuring that the upper extent of the dust guard slot is occupied by portions of the dust guard of less width than the dust guard slot thereby enabling the journal box to be easily vented.

As was mentioned, it is of advantage in many instances to afford an effective seal fit between the journal and the opening in the dust guard through which the journal extends. Another object of the present invention is to accomplish this, and specifically by means of a separable seal ring disposed about the aforesaid opening in the dust guard and related thereto in such way as to be capable of yielding in a particular way to thereby increase the effectiveness of the seal fit. Moreover, the seal ring may be of such construction as to provide multiple line contact with the journal further increasing the effectiveness of the seal fit, and such constitutes a further object of the present invention.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 1 is a sectional view of the journal box of a railway car having a dust guard of the present invention mounted therein;

Fig. 2 is an elevation of a dust guard of the present invention;

Fig. 3 is a sectional view taken substantially on the line 3—3 of Fig. 2;

Figs. 4 and 5 are detail sectional views of modifications;

Fig. 6 is a plan view of the seal plate without a retainer or seal ring; and

Fig. 7 is a sectional view taken substantially on the line 7—7 of Fig. 6.

In Fig. 1 there is shown a journal box JB of standard construction in which the journal J of a railway car axle CA is adapted to rotate. A segmental bearing B of standard form and construction is arranged in the upper part of the journal box and is provided with a lining BL of bearing metal and on which a journal J rotates. The bearing B is retained in place by a wedge W of the usual kind.

The front of the journal box JB is represented by a lid L which as is well known enables the journal box to be inspected particularly for the purpose among others of checking on the supply of lubricant and the condition of the lubricator and bearing in the journal box. As is well known, lubricant for the bearing B and a lubricator which is adapted to relay such lubricant to the journal J are usually provided in the bottom of the journal box beneath the journal J, but inasmuch as these aspects of practices in the art are well known such have not been illustrated herein.

The rear side of the journal box opposite the lid L is on the side next to the wheel (not shown) of the car. It is from this side of the journal box that the journal J is extended into the journal box, and to enable this to be accomplished the journal box JB includes a relatively large opening 10 through which the journal portion J of the car axle is adapted to extend. It is the opening 10 as thus provided which needs to be sealed or closed off by a dust guard, the dust guard being such as to surround the so-called dust guard seat portion 12 of the journal J. It will be observed that the boundaries of the dust guard seat 12 are defined by conventional filleted surfaces 13 and 14 which lie adjacent the journal J and the wheel seat 15, respectively, of the car axle.

The journal box JB is of standard construction, and includes a dust guard slot 20 defined by a pair of spaced apart walls 21 and 22 having inner peripheries or edges which define the opening 10 in the journal box through which the journal J is extended. The slot is open at the top, but is normally closed by a plug (not shown), and a dust guard 25 constructed in accordance with the present invention is adapted to be mounted in the dust guard slot 20 upon removal of the plug as will now be explained.

The dust guard 25, Figs. 2 and 3, includes a relatively rigid seal plate 26 of plywood or the like having opposed side edges 27 and 28 and a rounded bottom edge 29. Thus, the edges 27, 28 and 29 are complementary in outline to the outline of the dust guard slot 20 which as is well known is generally of U shape. The outside dimensions of the seal plate 26 are slightly larger than the inside dimensions of the dust guard slot 20 so that when the central opening in the dust guard to be described hereinafter is concentrically related to the opening 10 in the journal box, marginal portions of the seal plate 26 are extended into the dust guard slot on all sides.

An aspect of the present invention is that the plate 26 is of substantially less width than the dust guard slot 20, and the advantage of this is that when the dust guard is arranged within the dust guard slot in a manner to be described hereinafter the interior of the journal box can be easily vented through the passageway at the top of the journal box, Fig. 1, afforded as a result of the spaced relation established between the opposed front and rear outer faces of the plate 26 and the opposed walls of the dust guard slot. This prevents the build-up of pressure within the journal box incidental to pumping action of the journal J.

In order that the foregoing advantageous relationship can be established, the dust guard 25 is provided with a separable resilient retainer 32, Fig. 2, adapted to fit about a portion only of the outer periphery of the plate 26. Preferably the retainer 32 is of resilient high friction material such as synthetic rubber or the like, and in the present instance the retainer 32 is complementary to the lower rounded edge 29 of the plate 26. Thus, as shown in Fig. 2, the retainer 32 is arcuate, substantially C-shaped or U-shaped in outline, and includes a pair of spaced walls or flanges 33 and 34, Fig. 3, which are joined by an integral bight portion 35. This arrangement results in a substantially U-shaped section which affords a central cavity or slot 36, Fig. 3, constituting mounting means in which the lower edge portion of the plate 26 can be removably inserted with the inner faces of the flanges 33 and 34 engaging the opposed front and rear faces of the bottom portion of the plate 26 as shown in Figs. 1 and 3. As will be appreciated from Fig. 1, the width of the retainer 32 between the outer faces of the flanges thereof is slightly larger than the width of the bottom of the dust guard slot 20. Accordingly, the retainer 32 when in operative position on the seal plate 26 is effective because of its frictional characteristics and dimensions to center the seal plate 26 in the dust guard slot 20 to establish the above mentioned passageway at the top of the dust guard slot 20. Moreover, the retainer 32 effectively seals off the bottom of the dust guard slot both as to loss of lubricant from the interior of the journal box and entrance of undesired foreign matter such as water, grime and the like from the outside of the journal box to the interior thereof. It may be additionally pointed out that the disposition and arrangement of the retainer 32 enables the dust guard 25 to absorb axial thrust from the journal without undue likelihood of rupture or breakage of the dust guard 25. In other words, the foregoing relationship imparts some "play" to the dust guard, but at the same time the dust guard slot is effectively sealed at the bottom thereof together with the above mentioned venting aspect. It will also be realized that the arrangement enables the seal plate 26 and the retainer 32 to be readily separated, and preferably the parts are joined to exploit this advantage, using a suitable adhesive, tight press fit or removable fastener.

An important feature of the present invention is the way in which the dust guard 25 is used to seal the portion 12 of the journal or car axle which corresponds to the dust guard slot 20. Thus, as shown in Fig. 6, the seal plate 26 is formed with a relatively large opening 40 in the medial portion thereof through which the journal portion of the car axle is adapted to extend, and under the present invention a resilient liner or seal ring 42, Figs. 2 and 3, is associated with the medial opening 40 in the seal plate 26. There have of course been previous disclosures of dust guards for journal boxes embodying a journal seal, but the journal seal under the present invention embodies details that establish advantageous relationships as will presently be described. Thus, the seal ring or liner 42 is selected of resilient material such as semi-hard rubber or the like which can be distorted sufficiently to enable the seal ring to be fitted about the medial opening 40 in the seal plate 26. As shown in Fig. 2, the seal ring 42 is an integral one-piece member substantially U-shaped in section embodying annular flanges or rims 44 and 45 joined by an intermediate bight or web wall 46. The inner diameter of the seal ring 42 is substantially the same as the diameter of the portion 12 of the car axle so that normally there is a slight seal fit of the seal ring 42 about the portion 12 of the car axle, thereby sealing the journal J both as to loss of lubricant and entrance of foreign matter into the journal box.

Surrounding the medial opening 40 in the seal plate 26 and concentrically located thereto on either side thereof are respective milled slots or grooves 48 and 49, Fig. 7, and the outer diameter of the slots 48 and 49 corresponds substantially to the outer diameter of the annular flanges 44 and 45 of the seal ring 42. Accordingly, when the seal ring 42 is mounted in place the peripheral edges of the flanges 44 and 45 thereof abut or engage shoulders 48S and 49S on the seal plate 26 which represent the outer limits of the grooves 48 and 49. As will be observed in Fig. 3, the intermediate or bight section 46 of the seal ring 42 is arcuate in cross-section so as to establish merely a line contact with the journal J. As will be further observed in Fig. 3, the inner wall or face of the bight section 46 of the seal ring 42 is spaced radially inwardly from the annular wall of the seal plate which defines the medial opening 40 in the seal plate 26 so that there is normally a spaced relationship between the medial opening 40 and the opposed wall of the seal ring 42 affording an annular chamber 50. This relationship of course enables the seal ring 42 to effectively hug the journal much in the nature of a rubber band, since, by reason of the spaced relationship between the wall of the seal plate about the opening 40 therein and the opposed inner wall of the seal 42, the seal 42 can be made with a diameter slightly smaller than that of the journal portion 12. Moreover, grease or other viscous lubricant if desired can be packed in the annular space or chamber 50, and under such circumstances the web portion 46 of the seal 42 is provided with openings 51, Fig. 3, which communicate with the chamber 50 and through which such lubricant can exude to reduce friction between the seal 42 and the journal J and also to enhance the effectiveness of the seal fit. The openings 51 preferably are located along a line representing the minimum diameter of the ring 42, namely, on the line of contact with the journal J.

The effectiveness of the seal contact between the seal ring and the portion 12 of the journal can be increased by providing spaced annular ribs about the inner or journal diameter of the seal ring, and modified seal rings 42A and 42C of this kind are shown in Figs. 4 and 5 respectively. The bight portions of the rings 42A and 42C which join the outer walls or rims 44 and 45 thereof are each formed with pairs of annular ribs 55 which are arcuate in cross section so as to make a line contact with the journal, and the arrangement inherently produces a groove 56A in one instance and 56C in the other between the ribs, depending upon the particular mold used. Again the seal ring is radially spaced appreciably from the wall of the seal plate which defines the opening 40 with the advantages mentioned above, and each rib is provided with openings as 51A which communicate with the annular space 50 between the seal plate and the seal ring and through which lubricant or grease in the chamber 50 can exude.

Inasmuch as the molding of the grove 56A or 56C will produce a corresponding protuberance about the inner wall of the ring 42A or 42C, the seal plate 26 is preferably formed with a medially located groove 58 about the opening 40 in which the aforesaid protuberance is adapted to fit in the event movement of the journal causes radial inward compression of the seal ring. In order that the seal rings can be fully interchangeable the seal plates are in all instances provided with a groove 58.

It will be seen from the foregoing that under the present invention there is afforded a journal box dust guard which is relatively inexpensive to manufacture, which enables the dust guard slot as well as the journal to be effectively sealed and which nevertheless is capable of allowing the journal box to be vented.

Hence, while I have illustrated and described preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A dust guard for a journal box and comprising a relatively rigid seal plate having opposed front and rear faces with outer marginal portions which outer marginal portions are adapted to fit in a slot in said journal box, said seal plate having an upper portion and a lower portion and a medial annular opening formed therein between the upper and lower portions and through which a journal is adapted to extend, a separable retainer of resilient material mounted on the lower portion only of said seal plate leaving the opposed front and rear faces of the upper portion of the seal plate devoid of said retainer, said retainer having a pair of spaced walls having inner faces engaging the opposed front and rear faces of the bottom portion of said seal plate and having outer faces spaced from said opposed faces to impart increased width to the bottom of the dust guard while the remaining width of the dust guard in the portion devoid of the retainer is that of the width of the seal plate, a resilient one-piece annular seal ring of U-shaped section having opposed inner surfaces mounted on said seal plate to line said opening therein, said seal ring having spaced annular flanges engaging the annular areas of the seal plate which concentrically surround said opening in the seal plate and having a central annular web portion joining said flanges, said web portion being spaced radially inwardly from the annular wall of said seal plate which defines said opening therein to establish an annular space between said annular wall of the seal plate and the opposed surfaces of said web of the seal ring, said web being formed with openings therein which communicate with said annular space and open in the radially inwardmost portion of the surface of the web of the seal ring for supplying a lubricant within said annular space directly to the circumferential area of a journal in contact with the surface of the seal ring.

2. A dust guard for a journal box and comprising a relatively rigid seal plate having opposed front and rear faces with outer marginal portions which outer marginal portions are adapted to fit in a slot in said journal box, said seal plate having an upper portion and a lower portion and a medial annular opening formed therein between the upper and lower portions and through which a journal is adapted to extend, a separable retainer of resilient material mounted on the lower portion only of said seal plate leaving the opposed front and rear faces of the upper portion of the seal plate devoid of said retainer, said retainer having a pair of spaced walls having inner faces engaging the opposed front and rear faces of the bottom portion of said seal plate and having outer faces spaced from said opposed faces to impart increased width to the bottom of the dust guard while the remaining width of the dust guard in the portion devoid of the retainer is that of the width of the seal plate, a resilient one-piece annular seal ring of U-shaped section having opposed inner surfaces mounted on said seal plate to line said opening therein, said seal ring having spaced annular flanges engaging the annular areas of the seal plate which concentrically surround said opening in the seal plate and having a central annular web portion joining said flanges, said web portion being spaced radially inwardly from the annular wall of said seal plate which defines said opening therein to establish an annular space between said annular wall of the seal plate and the opposed surfaces of said web of the seal ring, said web portion being formed with pairs of spaced annular ribs which are arcuate in cross section so as to make a line contact with a journal, and said ribs including circumferentially spaced openings in the portion adapted to make said line contact for supplying lubricant within said annular space directly to the circumferential portion of a journal in contact with the seal ring.

3. A dust guard according to claim 2 wherein the annular areas of the seal plate concentrically surrounding said opening therein are provided with annular grooves which receive the flanges of the seal ring.

References Cited in the file of this patent

UNITED STATES PATENTS

| | | |
|---|---|---|
| 1,171,045 | Harrison | Feb. 8, 1916 |
| 2,152,937 | Vigne et al. | Apr. 4, 1939 |
| 2,159,825 | Stevens | May 23, 1939 |
| 2,177,441 | Pesarese | Oct. 24, 1939 |
| 2,257,119 | Johannesen | Sept. 30, 1941 |
| 2,668,067 | Fitzsimmons | Feb. 2, 1954 |

FOREIGN PATENTS

| | | |
|---|---|---|
| 278,092 | Switzerland | Jan. 3, 1952 |